US012454659B2

(12) United States Patent
Park et al.

(10) Patent No.: US 12,454,659 B2
(45) Date of Patent: Oct. 28, 2025

(54) VIRUCIDAL DETERGENT COMPOSITION COMPRISING A TERNARY COMBINATION OF NONIONIC SURFACTANTS

(71) Applicants: KOREA RESEARCH INSTITUTE OF CHEMICAL TECHNOLOGY, Daejeon (KR); UE CHEMICAL CO., LTD, Busan (KR)

(72) Inventors: Jong Mok Park, Daejeon (KR); Ho Youl Kong, Daejeon (KR); Bo Gyu Lim, Daejeon (KR); Seo Hyun Jung, Daejeon (KR); Yu Jin Jung, Daejeon (KR); Sung Chul Kim, Busan (KR)

(73) Assignees: KOREA RESEARCH INSTITUTE OF CHEMICAL TECHNOLOGY, Daejeon (KR); UE CHEMICAL CO., LTD, Busan (KR)

( * ) Notice: Subject to any disclaimer, the term of this patent is extended or adjusted under 35 U.S.C. 154(b) by 385 days.

(21) Appl. No.: 18/032,938

(22) PCT Filed: Oct. 22, 2021

(86) PCT No.: PCT/KR2021/014901
§ 371 (c)(1),
(2) Date: Jun. 1, 2023

(87) PCT Pub. No.: WO2022/086266
PCT Pub. Date: Apr. 28, 2022

(65) Prior Publication Data

US 2023/0399581 A1 Dec. 14, 2023

(30) Foreign Application Priority Data

Oct. 22, 2020 (KR) ........................ 10-2020-0137612

(51) Int. Cl.

| | |
|---|---|
| ***C11D 1/825*** | (2006.01) |
| ***C11D 1/72*** | (2006.01) |
| ***C11D 3/37*** | (2006.01) |
| ***C11D 3/48*** | (2006.01) |

(52) U.S. Cl.
CPC .............. *C11D 1/72* (2013.01); *C11D 3/3707* (2013.01); *C11D 3/48* (2013.01)

(58) Field of Classification Search
CPC ........... C11D 1/72; C11D 1/722; C11D 1/825; C11D 3/0094; C11D 3/48; C11D 7/5081; C11D 2111/12; C11D 2111/14
See application file for complete search history.

(56) References Cited

U.S. PATENT DOCUMENTS

| | | | | |
|---|---|---|---|---|
| 2008/0221006 A1* | 9/2008 | Heisig | ...................... | C11D 3/48 510/245 |
| 2011/0287054 A1 | 11/2011 | Hanon et al. | | |

FOREIGN PATENT DOCUMENTS

| | | | |
|---|---|---|---|
| EP | 1 187 897 | B1 | 12/2004 |
| JP | H06-80992 | A | 3/1994 |
| JP | 2004-352943 | A | 12/2004 |
| JP | 2005-171129 | A | 6/2005 |
| JP | 2008-543979 | A | 12/2008 |
| JP | 2014-526153 | A | 10/2014 |
| JP | 2017-501974 | A | 1/2017 |
| JP | 6688929 | B1 | 4/2020 |
| KR | 10-2270165 | B1 | 6/2021 |
| WO | WO 2015/079451 | A1 | 6/2015 |
| WO | WO 2018/078601 | A1 | 5/2018 |

OTHER PUBLICATIONS

International Search Report for PCT/KR2021/014901 mailed on Jan. 25, 2022.
Holmberg, K., "Applications of block copolymers", Institute for Surface Chemistry, 2000, pp. 305-318.
Farsang, E. et al., "Analysis of Non-Ionic Surfactant Triton X-100 Using Hydrophilic Interaction Liquid Chromatography and Mass Spectrometry", Molecules, Mar. 2019, vol. 24, No. 1223, pp. 1-13.
Office action issued on Jun. 25, 2024 from Japan Intellectual Property Office in a counterpart Japanese Patent Application No. 2023-549791 (all the cited references are listed in this IDS.) (English translation is also submitted herewith.).
European Search Report For EP21883333.3 issued on Jun. 21, 2024 from European patent office in a counterpart European patent application.
"Triton X-100", Wikipedia, Jun. 22, 2012, XP055030724, Retrieved from the Internet: URL:https://en.wikipedia.org/wiki/Triton_X-100.

* cited by examiner

*Primary Examiner* — Charles I Boyer
(74) *Attorney, Agent, or Firm* — The PL Law Group, PLLC

(57) ABSTRACT

A detergent composition may include 10 to 30% by weight of octylphenol ethoxylate, 0.1 to 5% by weight of 2-ethylhexyl alcohol ethoxylate, 0.1 to 5% by weight of ethylene oxide-propylene oxide block copolymer, and the balance of water, based on a total 100% by weight of the composition. The detergent composition may have an excellent virus removal effect in which more than 99.99% of corona virus is removed in 30 seconds. At the same time, provided is a safe detergent composition which has selective properties of not killing various bacteria, and satisfies skin hypoallergenic properties. In addition, the detergent composition is used for various purposes, such as removal of corona virus, removal of oil stains, removal of kitchen dirt, bathroom cleaning, cleaning of mechanical equipment and parts, and removal of oil stains on clothes, and exhibits excellent cleaning ability.

8 Claims, 6 Drawing Sheets

Example 2

Comparative Example 1

Example 3 Comparative Example 2

Example 2 Comparative Example 1

VIRUCIDAL DETERGENT COMPOSITION COMPRISING A TERNARY COMBINATION OF NONIONIC SURFACTANTS

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2021/014901, filed Oct. 22, 2021, which claims priority to the benefit of Korean Patent Application No. 10-2020-0137612 filed in the Korean Intellectual Property Office on Oct. 22, 2020, the entire contents of which are incorporated herein by reference.

BACKGROUND

1. Technical Field

The present invention relates to a detergent composition, and more particularly, to a detergent composition capable of effectively removing a corona virus

2. Background Art

Corona virus (CoV) is an RNA virus that causes widespread respiratory and digestive system infections in animals, including humans. When observing this virus through a microscope, it has distinct crown shaped protrusions on the surface thereof, and thus is called ‘corona (crown)’.

COVID-19 is an epidemic disease that occurred in Wuhan City, Hubei Province, China in December 2019, which is also called “a new type corona viral infection” and broadly known as a viral disease caused by variants of corona virus.

Although initially known only as a respiratory infectious disease of unknown cause, it has been found to be a novel corona virus, as like SARS (Severe Acute Respiratory Syndrome) that was prevalent in 2003 and MERS (Middle East Respiratory Syndrome) that was prevalent in 2012.

Viruses are individuals with both living and non-living characteristics, and are basically a simple structure containing nucleic acids (DNA or RNA), which are genetic materials, in an envelope composed of proteins. Viruses cannot perform life activities alone, but when entering a cell that becomes a host, they may parasitize in the life activity of the host cell and reproduce the genetic material and protein coat to multiply the population, thereby increasing the number of individuals.

The corona virus is a virus of the RNA family, and mutations occur frequently due to its low genetic stability compared to viruses of the DNA family. Further, in the process of mutation, some variants may be generated with strong infectivity and high fatality so as to propagate over an intermediate barrier such as between animals and humans. Such a corona virus has a double phospholipid membrane (i.e., phospholipid bilayer) derived from the host in the RNA family.

Further, when the structure of the corona virus is observed with a transmission electron microscope (TEM), it may consist of a double phospholipid membrane, and the phospholipid membrane has a structure having a $C_{10}$ to $C_{18}$ long carbon chain.

Meanwhile, alcohol-based detergents, which are currently and widely used as cleansing agents for COVID-19 virus, contain ethanol as a main component to dissolve the virus envelope (phospholipid) thereby exhibiting disinfection effects, and are now widely used in Korea.

This is because COVID-19 virus has a lipid bimolecular membrane structure, and ethanol dissolves the envelope of the virus that has an envelope composed of a phospholipid layer and protein, and even if a virus without an envelope dies from the outside or enters the host by luck, it prevents the virus from penetrating into the cell and proliferation thereof.

The novel corona virus causing COVID-19 infects human lung cells, which should get inside the lungs to cause the infection. To this end, the corona virus tries to stick to the receptor of the lung cell and then penetrate into the cell, wherein a site binding to the receptor is a spike protein in the envelope of the corona virus. When ethanol dissolves and removes the outer skin (i.e., the envelope), the spike protein also disappears, and as a result, even if entering the body in this state, it would lose the ability to penetrate into the cell.

However, since the alcohol-based detergents such as ethanol contain additional chemical components for the purpose of moisturizing the skin or sterilizing and bleaching, it is difficult to secure stability if irritation persists or continues such as rash or itching during use. Further, it is true that the alcohol melts the envelope of the corona virus and kills the virus, but it takes a certain amount of time for the virus that has lost its envelope to die. For this reason, no matter how evenly hand sanitizer is applied, there is a possibility that the virus with the envelope not destroyed still remains. Therefore, in order to completely block such risk factors as described above, there is no choice but to wash hands.

For example, Japanese Patent Registration No. 6688929 B1, which is a prior art including alcohol, proposes a disinfectant composition including protamine and/or a salt thereof as well as ethanol in order to demonstrate high sterilization effects while sufficiently exhibiting virus inactivation, wherein pH is 8.0 to 14.0, and a ratio of ethanol in the disinfectant composition is 30% by mass or more.

US Patent Laid-Open Publication No. 2011-0287054 proposes a multivalent influenza flu composition, including: a plurality of influenza antigens or antigen pre-preparation, wherein at least one antigen is selected from a strain associated with an outbreak; and an oil-in-water emulsion, wherein the oil-in-water emulsion additionally includes an emulsifier, and the emulsifier includes polyoxyethylene sorbitan monooleate, polyoxyethylene sorbitan trioleate, octylphenyl ethoxylate, lecithin, and a mixture thereof.

However, in order to effectively kill the corona virus, in spite of the current detergent, there is a need for a novel detergent that can effectively remove the phospholipid membrane contained in the corona virus, while not causing irritation when used in the human body.

SUMMARY

It is an object of the present invention to provide a skin low-irritation (i.e., hypoallergenic) detergent composition that selects ingredients included in the detergent composition having a complex structure, whereby the composition may bind well to a phospholipid membrane contained in a corona virus, and remove the same so as to effectively eliminate the corona virus while maintaining various germs (bacteria).

The detergent composition according to the present invention may include: 10 to 30% by weight of octylphenol ethoxylate; 0.1 to 5% by weight of 2-ethylhexyl alcohol ethoxylate; 0.1 to 5% by weight of ethylene oxide-propylene oxide block copolymer; and the balance of water, based on a total 100% by weight of the composition.

The composition may further include lauryl alcohol ethoxylate in an amount of 0.1 to 5% by weight of the total composition.

A corona virus removal rate in the diluted solution containing 0.1% by weight or less of the detergent composition according to the present invention may be 99.99% in 30 seconds.

Further, the detergent composition according to the present invention may be characterized in that bacteria are not removed when the corona virus is eliminated.

The detergent composition of the present invention does not have skin toxicity.

The detergent composition according to the present invention may be used for removing corona virus, removing oil stains, removing old kitchen stains, cleaning bathrooms, cleaning mechanical equipment and parts, and removing oil stains for clothes.

The detergent composition according to the present invention preferably maintains a neutral pH of 6.5 to 7.

It is preferable to use the detergent composition by diluting the same in water to reach a content of 5% by weight or less.

Further, the balance of water included in the detergent composition may include ethanol in an amount of 20% by weight or less.

In the present invention, as the main component included in the detergent composition, a material having a complex structure, in which aromatic and branched structures are mixed rather than a linear structure, is used, which in turn efficiently dissolves a phospholipid membrane contained in the corona virus, whereby excellent virus removal effects to eliminate more than 99.99% of corona virus in 30 seconds. At the same time, it has a selective property that does not kill diverse bacteria, and may provide a safe detergent composition that satisfies skin hypoallergenic properties.

This detergent composition has excellent cleaning ability as it is used for various purposes such as removal of corona virus as well as oil stain removal, kitchen dirt removal, bathroom cleaning, mechanical equipment and parts cleaning, and oil stain removal for clothes.

DETAILED DESCRIPTION

Figure 1:
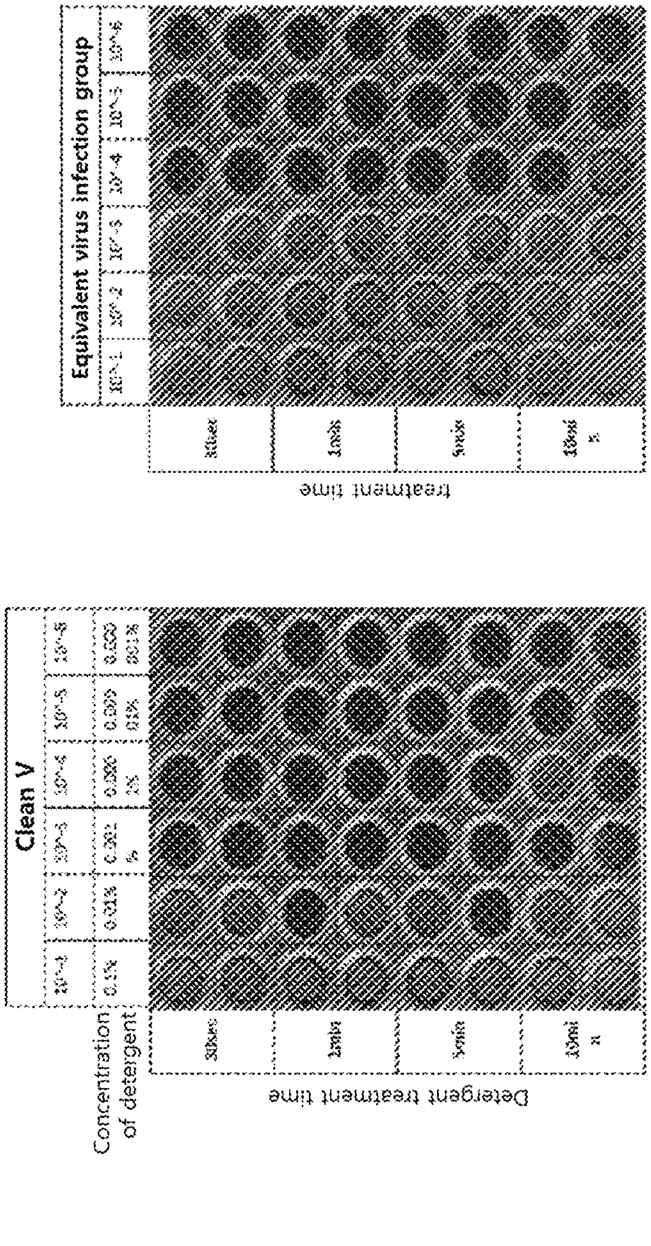
FIG. 1 illustrates results of measuring the corona virus removal rate in a diluted solution containing a detergent composition according to Example 2 of the present invention at a concentration of 0.1%.

Hereinafter, the present invention will be described in more detail as follows.

The terminology used herein is used to describe specific embodiments, not to limit the present invention.

As used herein, the singular form may include the plural form unless the context clearly dictates otherwise. Further, as used herein, "comprise" and/or "comprising" refers to the specific existence of the recited shapes, numbers, steps, actions, members, elements and/or groups thereof, and does not exclude the presence or addition of one or more other shapes, numbers, movements, members, elements and/or groups.

The present invention relates to a detergent composition effective for removing viruses, particularly corona viruses.

The detergent composition according to the present invention may include: 10 to 30% by weight ("wt. %") of octylphenol ethoxylate (the number (n) of ethylene oxides contained in the ethoxylate is 2 to 15); 0.1 to 5 wt. % of 2-ethylhexyl alcohol ethoxylate; 0.1 to 5 wt. % of ethylene oxide-propylene oxide block copolymer; and the balance of water, based on a total 100 wt. % of the composition.

The octylphenol ethoxylate is included as a main component of the detergent composition of the present invention, and may serve to remove and inhibit the corona virus.

In the octylphenol ethoxylate of the present invention, the octylphenol group is a C8 alkyl group containing an aromatic phenol group, and has a branched structure rather than a linear structure, such that this can be well combined with a hydrophobic portion consisting of a long carbon chain included in the phospholipid membrane of corona virus. Further, it is expected to increase the hydrophobicity due to the branched complex structure, which increases the aggregation number, thereby improving the solubilization ability of the phospholipid membrane of the corona virus.

Further, when having a branched structure compared to a linear structure, it is possible to form a structure that is much advantageous for dissolving the phospholipid bilayer because a packing density in micelles may decrease due to the repulsive force between hydrophobic hydrocarbons during the formation of the complex phospholipid bilayer structure and the micelles.

Further, the ethylene oxide moiety may serve to impart hydrophilicity to hydrophobicity of the long carbon chain. Therefore, "n" representing the number of ethylene oxides may range from 2 to 15, preferably 5 to 10, and it is preferable to mix and use two or more materials having the different numbers of n so as to desirably adjust the hydrophilicity.

If n is less than 2 in the octylphenol ethoxylate, this component does not have hydrophilicity enough to dissolve the phospholipid membrane of the corona virus, and may cause a problem in that the component is trapped between the long carbon chains of the corona virus phospholipid membrane. Further, this is undesirable since it may be difficult to prepare a formulation. On the other hand, if n exceeds 15, the hydrophilic property is too much due to an excess content of ethylene oxide, hence it is not preferable since the phospholipid membrane cannot be dissolved in the composition.

Such octylphenol ethoxylate may be included in 10 to 30 wt. % of the total detergent composition, and if the content is less than 10 wt. %, it is insufficient to exhibit the effects of removing and inhibiting the corona virus. If the content exceeds 30 wt. %, it is not preferable because additional effects are not exhibited.

Further, it is preferable that the detergent composition according to the present invention contains 2-ethylhexyl alcohol ethoxylate to increase penetration when it enters between the phospholipid membranes of the corona virus. Since the 2-ethylhexyl alcohol ethoxylate also has a less regular structure in which a hydrocarbon is substituted in the side chain, it may be expected to increase the penetration by separating a gap when entering between the phospholipid bilayer. The 2-ethylhexyl alcohol ethoxylate in which a hydrocarbon is substituted in the side chain may be included in an amount of 0.1 to 5 wt. % of the total detergent composition. If it is less than 0.1 wt. %, desired effects cannot be obtained. Further, if it exceeds 5 wt. %, it is also not preferable because additional effects of increasing the penetration cannot be obtained.

The ethylene oxide-propylene oxide block copolymer of the present invention is prepared by copolymerizing ethylene oxide and propylene oxide, and may be added to suppress the generation of bubbles during the preparation of the detergent composition. Further, the block copolymer may be included in an amount of 0.1 to 5 wt. % among the total detergent composition to effectively remove bubbles.

Further, the detergent composition of the present invention may include the balance of water other than the above configuration. The water is not particularly limited and may include, for example, general tap water, purified water from which all impurities such as dissolved ions, solid particles, microorganisms, and organic matter contained in general water are removed and the like.

Further, if necessary, the purified water may include less than 20 wt. % of ethanol in order to reduce a viscosity of the final detergent composition, to remove bubbles generated during the preparation of the detergent composition, or to improve preservation property of the detergent composition at a low temperature such as in winter.

In addition, the detergent composition according to the present invention may further include lauryl alcohol ethoxylate in an amount of 0.1 to 5 wt. % of the total composition, which is used as an adjuvant for octylphenol ethoxylate so as to effectively dissolve a phospholipid membrane.

The detergent composition according to the present invention may be easily prepared by mixing individual components well at room temperature (r.t.), and the prepared detergent composition has a hydrophobicity and hydrophilicity balance (HLB) value in a range of 12 to 15. Thus, when used as a cleaning agent for various purposes, appropriate micelles are formed in water to enhance the cleaning effect.

The detergent composition according to the present invention may be used for cleaning all contaminants regardless of aqueous or oily properties, such as removal of corona virus, removal of oil stains, removal of kitchen dirt, bathroom cleaning, cleaning of mechanical equipment and parts, and removal of oil stains for clothes.

Among them, in particular, the detergent composition according to the present invention may demonstrate effects of removing 99.99% of the corona virus such as SARS (Severe Acute Respiratory Syndrome), MERS (Middle East respiratory syndrome), novel corona virus, etc. in 30 seconds.

Further, the detergent composition according to the present invention has a feature that germs (bacteria) are not removed while eliminating the corona virus. In other words, it may have selectivity to eliminate only the virus we want to remove, while not killing other bacteria that can diversely exist regardless of harmfulness or harmlessness thereof.

Viruses are far more lethal to the human body and always cause disease, whereas bacteria are independent microorganisms with unique complexity and reproductive functions. Further, bacteria may also be utilized in human organs, for example, the gut flora may manage and maintain the pH level of the digestive system. Of course, when there are too many bacteria in the body or infection occurs with pathogenic bacteria, it may lead to a disease. On the other hand, bacteriophages (also known as bactericidal bacteria) may also be used to treat diseases Therefore, from the point of view as above, when the detergent composition according to the present invention is used, it would be understood that the target corona virus is effectively removed and suppressed, while diverse bacteria present in a microbial system are not removed, simultaneously.

Further, since the detergent composition according to the present invention has a feature that does not have skin toxicity, it can be safely used without other side effects when sprayed on the human body for prevention and removal of corona virus or used for disinfection of hands.

Further, the detergent composition according to the present invention is characterized by having the neutral pH of about 6.5 to 7. Accordingly, there is an advantage of minimizing damage or deterioration of the material to be cleaned, while being characterized by excellent cleaning effects.

Further, the detergent composition prepared according to the present invention is applicable to a variety of certain and desired uses such as for spraying, disinfection, cleaning, or the like, by diluting the same in water.

Hereinafter, preferred embodiments of the present invention will be described in detail. The following examples are only for illustrating the present invention, and the scope of the present invention should not be construed as being limited by these examples. In addition, although specific compounds are used in the following examples, it is apparent to those skilled in the art that similar effects can be exerted even when equivalents thereof are used.

Examples and Comparative Examples: Preparation of Detergent Composition

According to the constitutional composition of Table 1 below, each composition was put in purified water, mixed at 18° C., and thoroughly stirred to prepare each detergent composition. In the following Table 1, Comparative Example 1 is an example in which the range of n in octylphenol ethoxylate, as the main component of the detergent composition of the present invention, is out of the scope of the present invention; Comparative Examples 2 and 3 are examples in which the range of n in octylphenol ethoxylate as the main component of the detergent composition of the present invention belongs to the scope of the present invention but its content ratio is out of the scope of the present invention.

TABLE 1

| Content (weight %) | Water | Octylphenol ethoxylate n (content) | Octylphenol ethoxylate n (content) | 2-ethylhexyl alcohol ethoxylate | Ethylene oxide-propylene oxide block copolymer | Lauryl alcohol ethoxylate |
|---|---|---|---|---|---|---|
| Example 1 | 82.7 | 3 (10) | 13 (6) | 0.3 | 1.0 | — |
| Example 2 | 72.0 | 7 (8) | 10 (18) | 0.5 | 0.5 | 1.0 |
| Example 3 | 58.5 | 10 (15) | 2 (15) | 3.5 | 5.0 | 3.0 |

TABLE 1-continued

| Content (weight %) | Water | Octylphenol ethoxylate n (content) | Octylphenol ethoxylate n (content) | 2-ethylhexyl alcohol ethoxylate | Ethylene oxide-propylene oxide block copolymer | Lauryl alcohol ethoxylate |
|---|---|---|---|---|---|---|
| Comparative Example 1 | 88.0 | 1 (10) | — | 0.5 | 0.5 | 1.0 |
| Comparative Example 2 | 58.5 | — | 16 (30) | 3.5 | 5.0 | 3.0 |
| Comparative Example 3 | 89.7 | 5 (5) | 15 (4) | 0.3 | 1.0 | — |
| Comparative Example 4 | 72.0 | NEODOL ethoxylates (1) (26) | | 0.5 | 0.5 | 1.0 |

(1) NEODOL 91 (C9 to C11 alcohols) reacted with ethylene oxide to have a linear structure of primary alcohol (from Shell)

Experimental Example 1: Measurement of Corona Virus Removal Rate

In order to evaluate the corona virus removal rate (corona virus inactivation efficacy) of the detergent composition (Clean V) according to Example 2 prepared above, an experiment was performed as follows.

$1\times10^4$ Vero cells (monkey kidney epithelial cells) were cultured per well in a 96-well cell plate. Then, after dispensing $1\times10^3$ to $5\times10^3$ infectious viruses into an EP tube, the virus-cell culture medium (Gibco DMEM-0% FBS) was mixed so that the detergent has a concentration of 0.1%, followed by conducting a reaction for a reaction time of 30 seconds, 1 minute, 5 minutes and 10 minutes, respectively.

After the reaction was completed, the cell culture medium was rapidly frozen using dry ice, and the sample was stored in a deep freezer at −80° C. The prepared sample was diluted stepwise by 10-fold in a 96-well U-bottom plate using the cell culture medium. Cells cultured in the 96-well cell plate were washed once with 1× phosphate buffered saline (PBS), and the diluted sample was moved to the washed cells and reacted for 1 hour and 30 minutes. After completing the reaction, the previously contained cell culture medium was removed and replaced with a fresh cell culture medium containing an appropriate concentration of TPCK trypsin.

Cell transformation and SARS-CoV-2 virus proliferation were visually observed through a microscope for 2-3 days. Surviving cells were stained with 10% Crystal violet dye on the 3rd day after infection. Results thereof are shown in FIG. 1 below.

Next, referring to the results of FIG. 1, cells killed by virus or cells killed by detergent toxicity were not stained and observed transparently, while surviving cells were stained with crystal violet and thus were observed to be dark purple.

As a result of sterilizing about 1000 SARS-CoV-2 viruses in a cell culture medium with 0.1% detergent concentration for 30 seconds, the inhibitory effect was shown about 100 times greater than that of the visually equivalent virus-infected group, and it could be seen that the inhibitory efficacy was approximately 100-fold greater than that of the visually equivalent virus-infected group in all sterilization time conditions such as 30 seconds, 1 min, 5 min, and 10 min, respectively.

Except for the cytotoxicity caused by the detergent performed in Experimental Example 2 below, viruses were found to be inactivated under all dilution conditions including high concentrations in which about 1,000 to 5,000 SARS-CoV-2 viruses can grow. Therefore, it was confirmed that the corona virus inactivation efficacy of the detergent composition according to the present invention is 99% or more. In other words, it was determined that the detergent composition (sample name: Clean V) prepared according to Example 2 of the present invention has a corona virus (COVID-19) removal rate of 99.99% over 30 seconds to 10 minutes compared to the control, even when used in diluted state at a concentration of 0.1%. That is, it can be confirmed that an effective corona virus removal rate of 99.99% is achieved in a very short time of 30 seconds.

Experimental Example 2: Cytotoxicity Evaluation of Detergent Composition

In order to evaluate the cytotoxicity of the detergent composition (Clean V) according to Example 2, an experiment was performed as follows.

$1\times10^4$ Vero cells (monkey kidney epithelial cells) were cultured per well in a 96-well cell plate. A detergent and a cell culture medium were mixed under the same conditions as in Experimental Example 1 above. The prepared sample was diluted stepwise by 2-fold in a 96-well U-bottom plate using the cell culture medium. Cells cultured in the 96-well cell plate were washed once with 1× phosphate buffered saline (PBS), and the serially diluted sample was moved to the washed cells and reacted for 1 hour and 30 minutes. After completing the reaction, the previously contained cell culture medium was removed and replaced with a fresh cell culture medium containing an appropriate concentration of TPCK trypsin. Then, the cell transformation was visually observed through a microscope for 2-3 days. On the 3rd day after treatment, surviving cells were stained using 10% Crystal violet dye, and results thereof are shown in FIG. 2 below.

Figure 2:
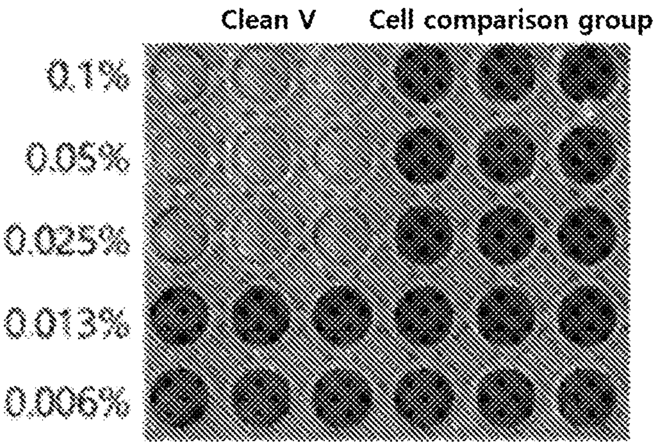
FIG. 2 illustrates basal cytotoxicity evaluation results of the detergent composition according to Example 2 of the present invention.

Next, referring to FIG. 2, as a result of administering a mixed cell culture medium having a concentration of 0.1 to 0.006% detergent to uninfected cells, cytotoxicity was observed for the detergent concentration of up to 0.025%.

Experimental Example 3: Washing Ability Test for Vegetable Oil

The vegetable oil washing ability of each of the detergent compositions according to the above examples and comparative examples was subjected to comparison experiments. Vegetable oil (perilla oil) was applied in the same amount and size to the surface of SUS having a predetermined size and then washed with water at 70° C. Following this, the detergent composition was diluted in water to prepare each of solutions at a concentration of 4% and 20%, respectively. The above SUS was washed again with the diluted solution at 60° C. and dried. Then, 50 ml of methyl alcohol was added to the surface of SUS in order to dissolve the remaining vegetable oil, followed by collecting the same. Further, the same amount, that is, 50 ml of water was added, followed by visually observing the surface state and solution state used in each test, and the results were respectively shown in FIGS. 3 to 4 (surface) and FIGS. 5 to 6 (solution) below.

Figure 3:
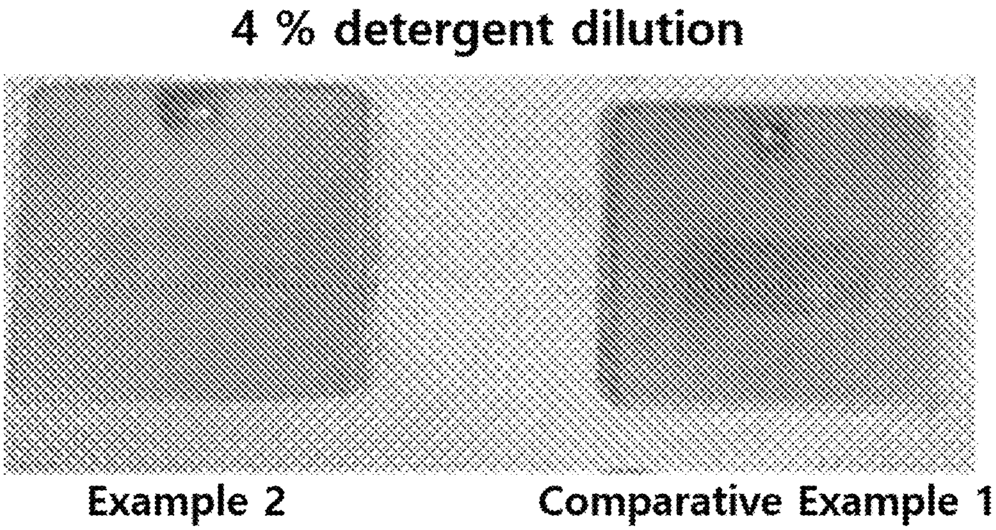
FIGS. 3 to 6 are photographs of cleaning ability test results and turbidity measurement of the solutions when washing vegetable oil using each of the detergent compositions according to the examples and comparative examples of the present invention.
Figure 4:
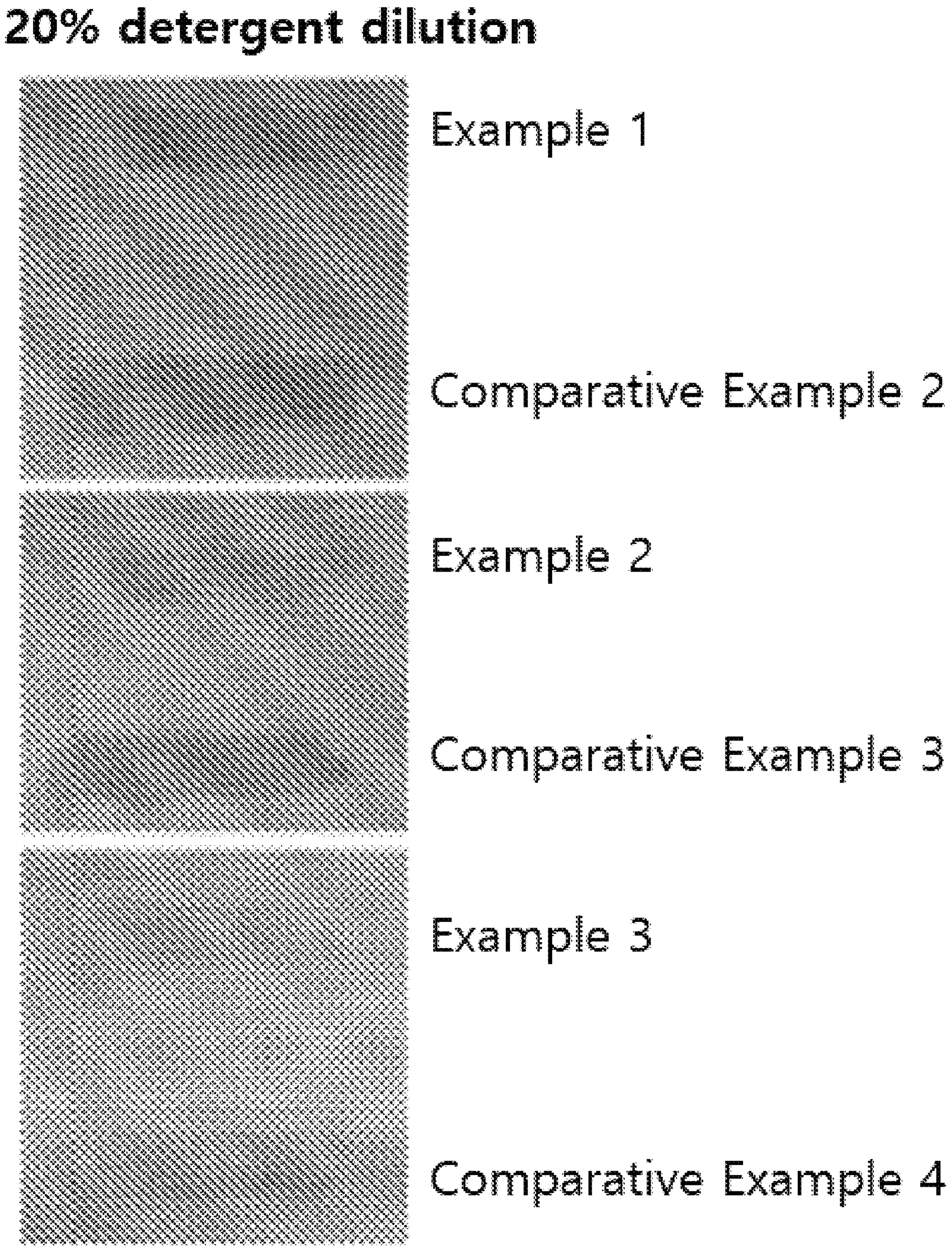

Next, referring to FIGS. 3 and 4, the reaction rates of the composition according to the example of the present invention and the composition according to the comparative example were similar to each other, however, it was observed that, when the surface treated with vegetable oil was washed using the composition according to the example, a content of the remaining vegetable of oil is lower.

Figure 5:
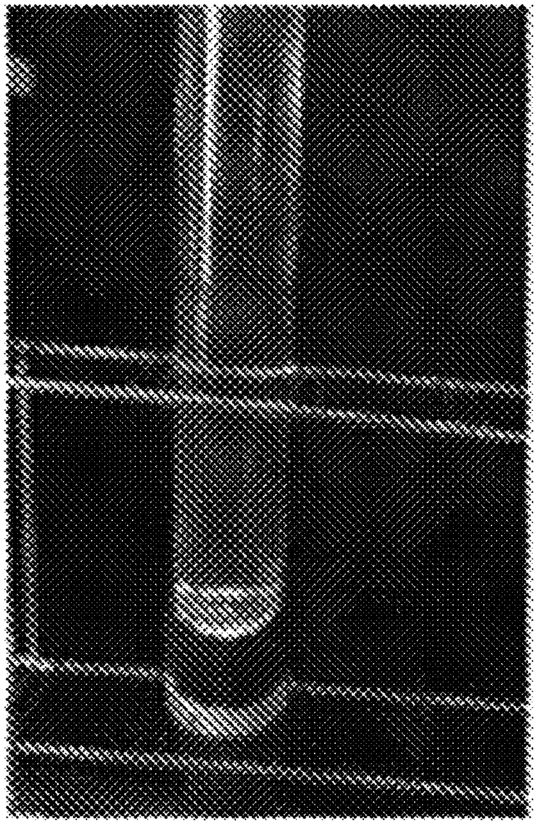
Figure 5:
Figure 6:
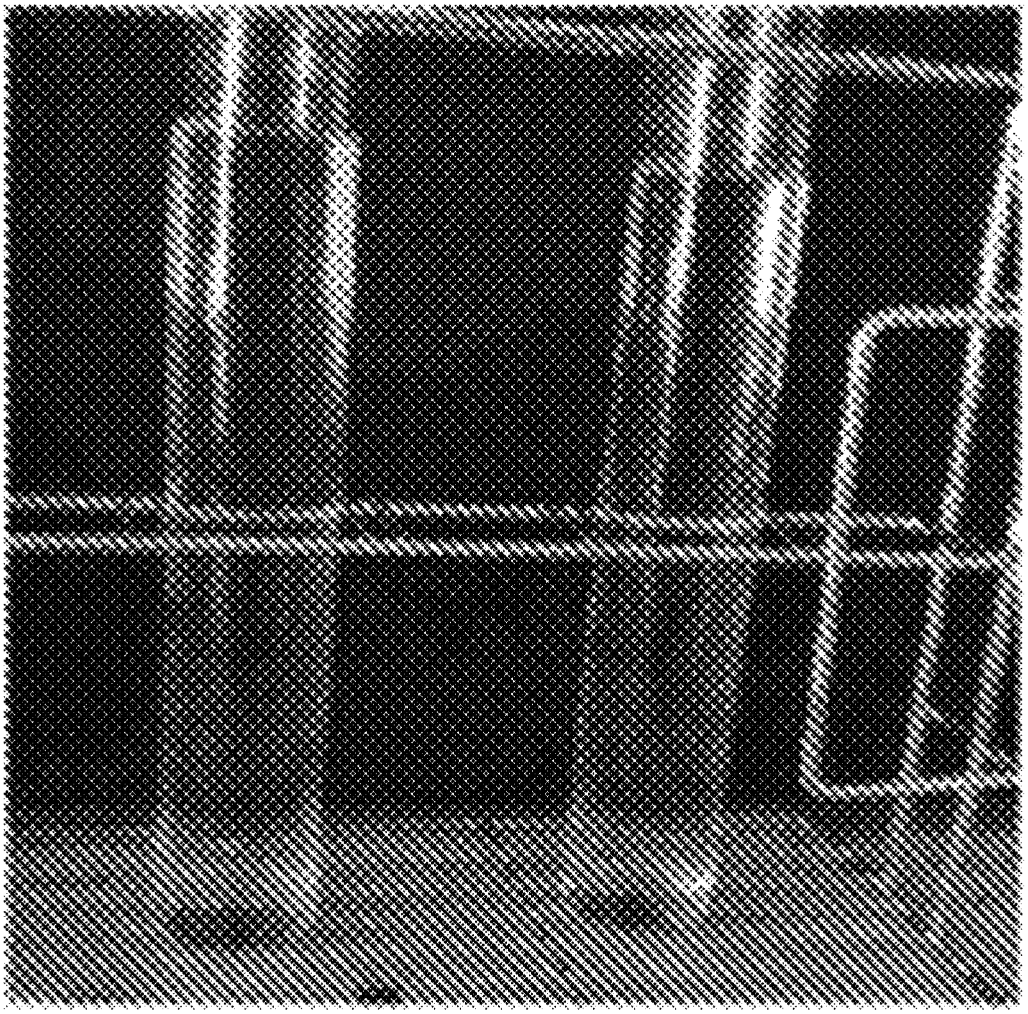

Further, referring to FIGS. 5 to 6, when using Comparative Example 1 in which the number of ethylene oxides in octylphenol ethoxylate is out of the scope of the present invention, it was observed that the vegetable oil was not completely washed but separated from the mixture of methyl alcohol and water, and thus, lots of floats are floated thereon.

Further, in the case of Comparative Example 2 in which, even though the number of ethylene oxides in octylphenol ethoxylate is the same, its content is out of the scope of the present invention, the vegetable oil is not completely washed but remains, as compared to Example 3 having the same number of ethylene oxides. Therefore, it was observed to the vegetable oil still remains in a mixture of methyl alcohol and water.

Experimental Example 4: Washing Ability Test for Animal Oil

In Experiment Example 4, except for using animal oil (pork oil) instead of the vegetable oil, the washing ability was tested by the same process as in the above Experimental Example 3 using the vegetable oil, wherein each of the detergent compositions according to Example 2 and Comparative Example 4 was diluted in water to a concentration of 20%, and used in the experiment. Results thereof are shown in FIG. 7.

Figure 7:
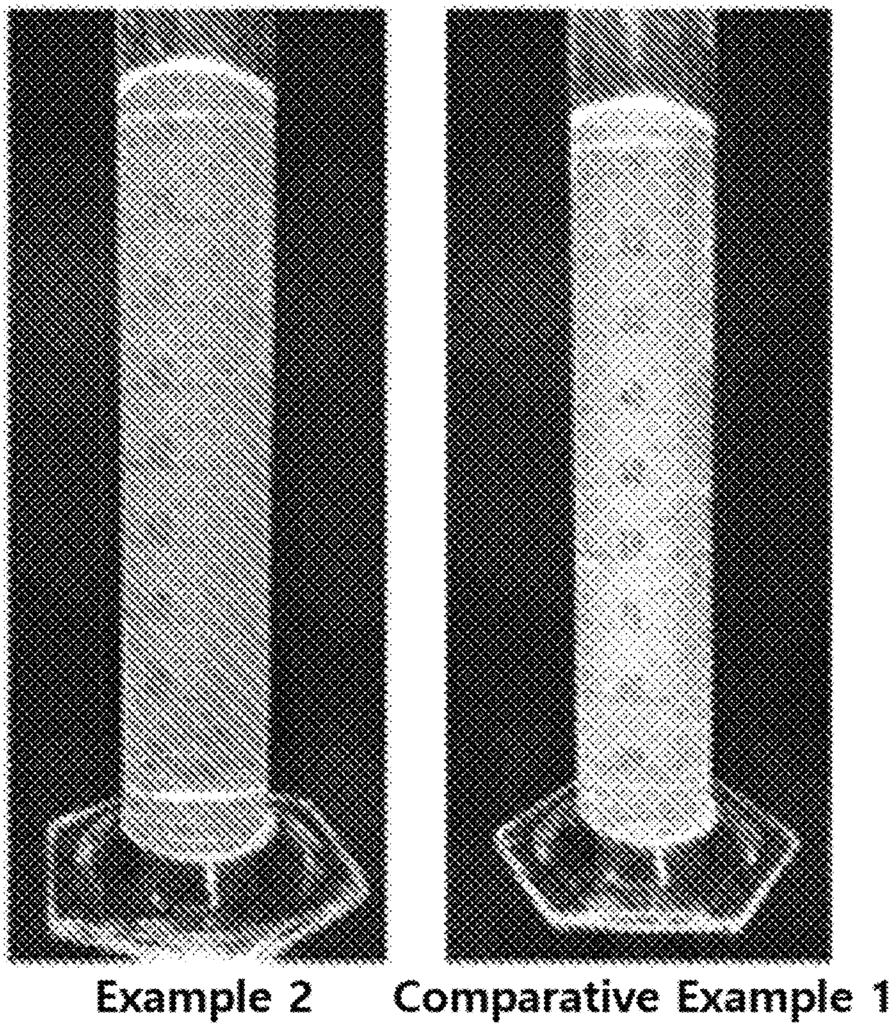
FIG. 7 is a photograph of turbidity measurement of a solution showing test results of animal oil washing ability of each of the detergent compositions according to Example 2 and Comparative Example 1 of the present invention.

Next, referring to FIG. 7, the composition of Comparative Example 4 using a linear structure, instead of octylphenol ethoxylate having an aromatic structure and a branched structure in the present invention, showed that animal oil is not completely washed but separated from the mixture of methyl alcohol and water, as compared to the detergent composition according to Example 2 of the present invention. Therefore, it was observed that the solution was very turbid.

From these results, it was confirmed that the cleaning ability is significantly different depending on the structural characteristics of the components used in the detergent composition, and it could be understood that the cleaning ability is more excellent when the branched structure is also present along with the linear structure as in the present invention, compared to the case of having the linear structure alone.

What is claimed is:

1. A detergent composition, comprising:

A) 10 to 30% by weight of octylphenol ethoxylate;

B) 0.1 to 5% by weight of 2-ethylhexyl alcohol ethoxylate;

C) 0.1 to 5% by weight of ethylene oxide-propylene oxide block copolymer; and

D) the balance water, based on a total 100% by weight of the composition, wherein the detergent composition maintains a neutral pH of 6.5 to 7.

2. The detergent composition according to claim 1, further comprising lauryl alcohol ethoxylate in an amount of 0.1 to 5% by weight of the total composition.

3. The detergent composition according to claim 1, wherein a corona virus removal rate in the diluted solution containing 0.1% by weight or less of the detergent composition is 99.99% in 30 seconds.

4. The detergent composition according to claim 3, wherein bacteria are not removed when the corona virus is eliminated.

5. The detergent composition according to claim 1, wherein the detergent composition does not have skin toxicity.

6. The detergent composition according to claim 1, wherein the detergent composition is used for removing corona virus, removing oil stains, removing old kitchen stains, cleaning bathrooms, cleaning mechanical equipment and parts, and removing oil stains for clothes.

7. The detergent composition according to claim 1, wherein the detergent composition is used by diluting the same in water to reach a content of 5% by weight or less.

8. The detergent composition according to claim 1, wherein the balance of water further includes ethanol in an amount of 20% by weight or less.

* * * * *